Oct. 6, 1959   R. ZARGARPUR   2,907,297
SPEEDOMETERS

Filed April 26, 1955   3 Sheets-Sheet 1

INVENTOR: ROUHOLAH ZARGARPUR

BY   *John C. Black*
ATTORNEY

Oct. 6, 1959   R. ZARGARPUR   2,907,297
SPEEDOMETERS

Filed April 26, 1955   3 Sheets-Sheet 2

INVENTOR
ROUHOLAH ZARGARPUR
BY *John C Black*
ATTORNEY

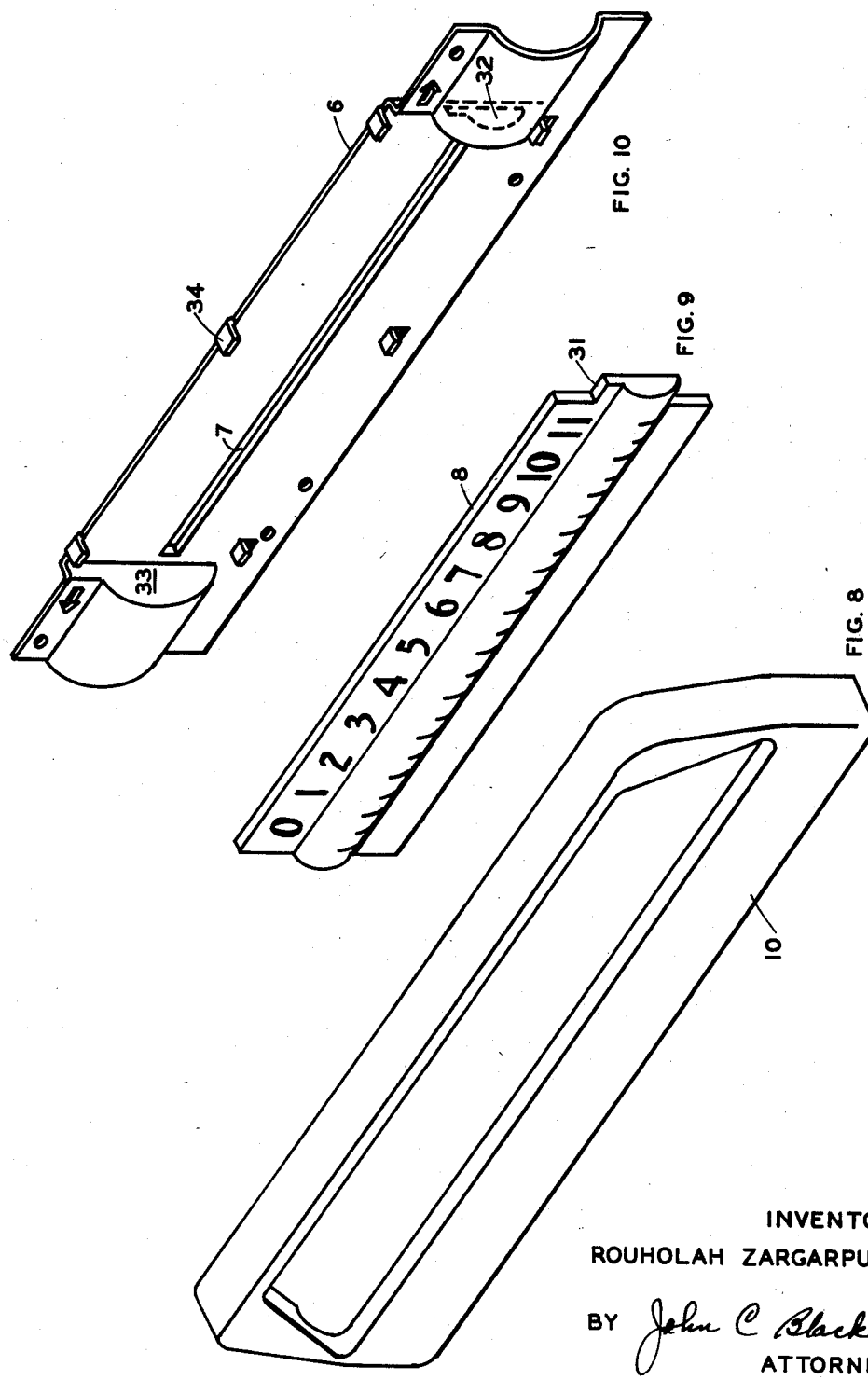

United States Patent Office 2,907,297
Patented Oct. 6, 1959

2,907,297

SPEEDOMETERS

Rouholah Zargarpur, River Forest, Ill., assignor to Stewart-Warner Corporation, Chicago, Ill., a corporation of Virginia Application April 26, 1955, Serial No. 503,890

3 Claims. (Cl. 116—116)

This invention relates in general to speedometers and more particularly to the use therein of color schemes and lighting effects for indications.

There has been emphasis in recent years to relieve the strain upon the operator of a vehicle and remove as many unnecessary distractions as possible within the vehicle so that a greater degree of safety during operation will be achieved. This emphasis has been stressed in the vehicle instrument field, and designers have been extremely active in providing instrument panels the readings of which can be more easily seen by the vehicle operator.

It is with this particular problem that the present invention is primarily concerned. In his co-pending application, Serial Number 496,162, filed March 23, 1955, now U.S. Patent No. 2,855,889, the applicant herein disclosed an improved indicator arrangement for use in ammeters, and in oil pressure, temperature and fuel gauges which, together with the speedometer arrangement of the present application, provides a unique instrument panel arrangement designed to promote comfort and safety for the vehicle operator.

Accordingly, it is the primary object of the present invention to provide a vehicle speed indicating arrangement which will reduce strain upon the vehicle operator and which will promote safety.

In pursuance thereof, the applicant herein provides a novel speedometer arrangement in which light of different colors is reflected from the speedometer and directed toward the operator to give the operator a general indication of the range (between an upper and lower limit) of his present speed and of the approximate actual speed within said range without his looking directly at the speedometer. Each of said reflected colors is indicative of a particular range of speed and the hue of the particular color is varied as the speed increases from the lower end of its respective range toward the higher end. This is especially advantageous during night driving when it is particularly advantageous that the driver keep his eyes on the road at all times and when it is more difficult to read the speedometer.

Another feature, closely related to the one immediately above, is the use in the preferred embodiment of color combinations universally recognized in the United States as indications of the absence of danger, proceed with caution, and the presence of danger—i.e., green, amber, and red respectively. It will be noted that in such an arrangement the operator, while driving at night on a highway, need never look at the speedometer until the reddish hue is reflected, and that only while said reddish hue is present need he glance occasionally at the speedometer itself. A somewhat similar situation arises in city driving during which the operator need glance at the speedometer only if the color reflected from the speedometer changes from green (which if properly adjusted indicates the safe driving range within the city limits) to amber, which indicates that the vehicle is proceeding at a rate close to or higher than the speed limit. Therefore, as long as green is reflected from the speedometer, the driver need not look at the speedometer to determine the speed. It has been assumed in the foregoing discussion that the reflected colors are arranged such that green will be reflected while the car speed is between zero and some predetermined speed, such as a city limit of 25 m.p.h., and that amber will be reflected if the car speed is between said first predetermined speed and a second predetermined speed such as a highway speed limit of 50 m.p.h., and that red will be reflected if the speed is above said second predetermined speed.

Another feature is the use of a face dial made of a transparent material such as an acrylic plastic, which is edge-lighted by colored light, the surface of which material is disturbed to cause the colored light to be reflected therefrom.

Another feature is the disturbance of said dial so that the calibration lines reflect the colored light.

Another feature is the disturbance of said dial so that the speed indicating numerals reflect the colored light.

Another feature of this invention is the use of a color disc interposed between the source of light and the acrylic plastic dial and mounted on the axis of the speedometer drum and rotatable therewith to pass colors indicative of the speed of the vehicle for edge-lighting said dial.

An auxiliary feature is the use of a two-color rotatable drum, the intersection of the colors describing a line spirally winding about the cylindrical surface of the drum, and a vertically disposed socket assembly having a slit therein adjacent to and longitudinally parallel with the axis of the drum so that, as the drum rotates in accordance with the speed of the vehicle, the line on the drum appears as a straight-line indication of the speed. Not only does the abovesaid line indicate the speed accurately, but an operator can judge the approximate speed by a mere momentary glance to note the relative lengths of the visible portions of the two colors.

Another feature is the use of a unidirectional magnifying lens portion in the dial face for magnifying the abovesaid line and for causing it to appear in a more vertical position.

A feature of this invention is the use of red as one of the colors on the drum and arranged such that red becomes more and more predominant as the speed of the car increases.

Another feature of this invention is the use in the preferred embodiment of black as the other color on the drum, used in combination with red. It will be noted that the use of black and red is particularly advantageous in the event that the same style speedometer is used in vehicles sold to people who are color blind, because the intersection of red and black is easily distinguished by the color blind.

Another feature is the use in the preferred embodiment of a narrow white line on the drum separating the colors red and black. It has been discovered that the use of the white line between the black and red makes the line of division stand out more clearly.

Another feature is the use of fluorescent red pigment on the drum and a hidden source of light, which causes the pigment to glow in order to make the color more readily discernible.

Other objects and features will be evident upon a perusal of the following disclosure in which Fig. 1 is a top view of the speedometer case and the instrument panel partially in section;

Figs. 8–10 show an exploded view of the retainer, face dial, and socket assembly of the instrument panel.

Figure 4:
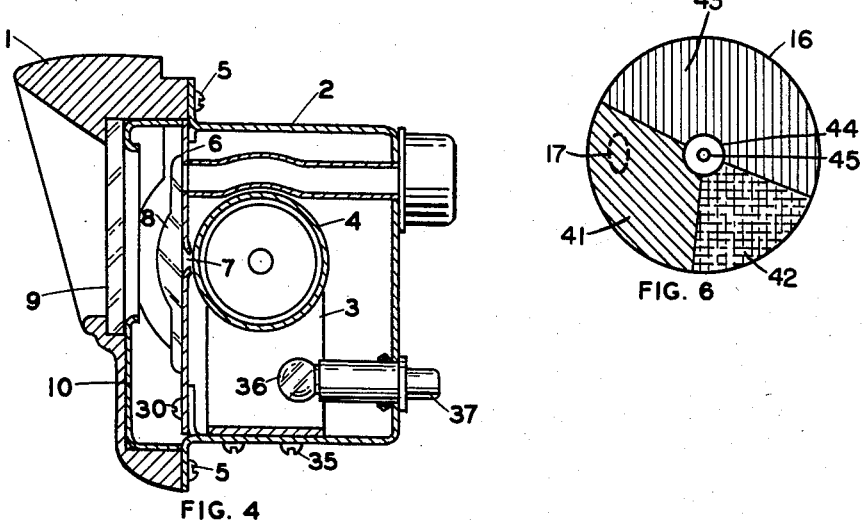
Fig. 4 shows a side elevational view through lines 4—4 of Fig. 1.

With particular reference to Fig. 4, a speedometer case 2 is secured to the instrument panel 1 by means of screws 5. A socket assembly 6 is rigidly secured to the bottom of case 2 by screws 30, said socket assembly having a slit 7 extending longitudinally across the length of the socket assembly. Said socket assembly 6 (Fig. 10) is also formed to receive the face dial 8—i.e. the projection 31 of dial 8 is press fit into opening 32 in socket assembly 6, the opposite end of dial 8 fits snugly against surface 33 of assembly 6 and lugs 34 prevent vertical movement of dial 8. The instrument panel 1 is adapted to receive a glass plate 9; and a retainer 10 is snugly fit between said glass 9 and the socket assembly 6 to maintain them in the positions shown in Fig. 4.

A drum 4 is rotatably mounted on a bracket 3 with its axis in a horizontal position adjacent to slit 7 of the socket assembly 6 (Fig. 4). Said bracket 3 is rigidly secured to the case 2 by screws 35. With particular respect to Fig. 3, it will be noted that a drive shaft 11 rotates a magnet arrangement 12 which is disposed symmetrically within the left-hand end of drum 4. A speed cup 13 is rotatably mounted on an axis coincident with that of magnet assembly 12 but independent therefrom. Said cup 13 is press fit into the end of drum 4 and envelopes the magnet assembly 12.

A pair of lamps 36, held by snap-in sockets 37, are positioned below the drum 4. The rear of the socket assembly 6 is painted white to direct light from said lamps toward the fluorescent red surface of the drum 4 so that it is more readily visible through the slit 7. In order to provide a more even distribution of light upon the drum 4, that portion of socket assembly 6, in line with the lamps 36, is painted black.

Figure 1:
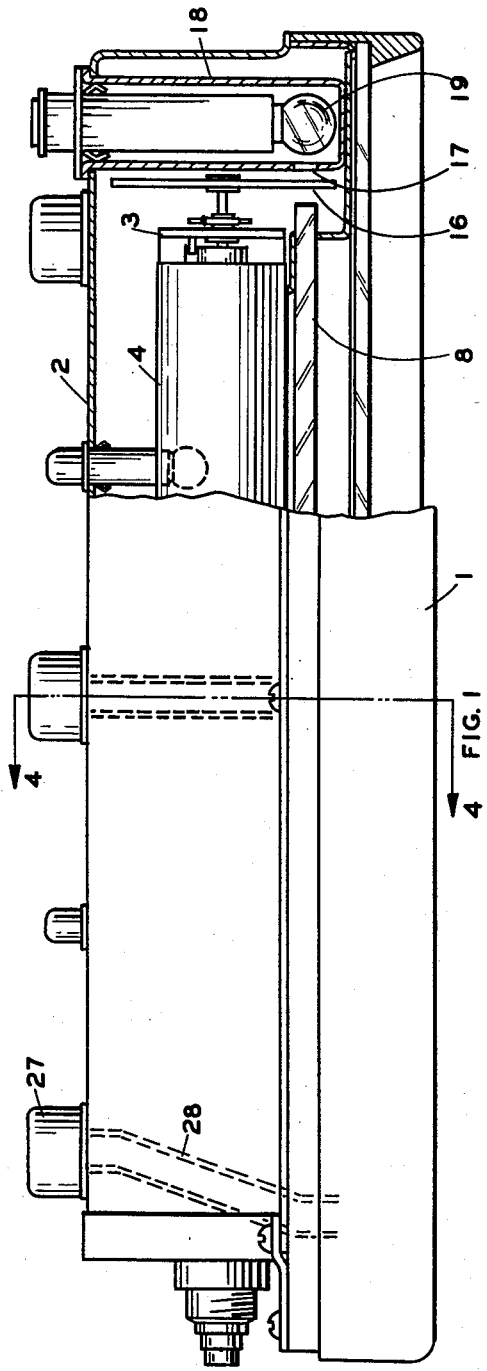
Figure 6:
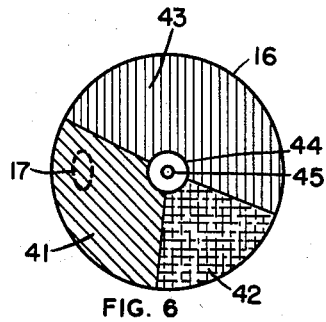
Fig. 6 shows the preferred color scheme used on the light filter disc.
Figure 7:
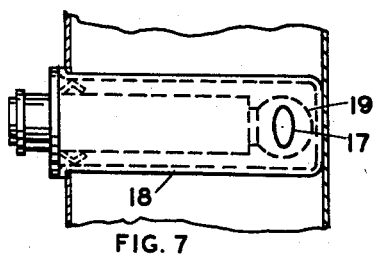
Fig. 7 shows a side view of the shield for the lamp which is used to edge-light the dial.

Attention is directed to Fig. 1 in which a color disc 16 is rotatably mounted on the same axis as drum 4. Said disc is painted with transparent paints according to Fig. 6, i.e., radial segments 41, 42 and 43 are painted green, amber and red, respectively. The disc 16 is shown in Fig. 6 in the position it will assume when the drum 4 is in a position corresponding to zero miles per hour. Opening 17 has been superimposed in dotted lines upon disc 16 in Fig. 6 to show the relative position of the disc 16 to opening 17 at zero miles per hour. As the speed of the vehicle increases, disc 16 will rotate clockwise with respect to Fig. 6 whereby the green portion 41, then the amber portion 42 and finally the red portion 43 will rotate to a position adjacent the opening 17. With the segments painted as shown in Fig. 6, the light reflected from the face dial 8 will be green from zero to approximately 25 m.p.h., amber from about 25 to 50 m.p.h., and red above 50 m.p.h. It is inherent in the structure shown that the shades of each color vary at 25 and 50 m.p.h. because the light passes through the adjoining colors green and amber and red and amber respectively. The critical speeds of 25 and 50 m.p.h., of course, can be changed if desired. Disc 16 is press-fit upon a bushing 44 which, in turn, is press-fit on a shaft 45. Shaft 45 is supported in a bearing 46 (Fig. 3) and is press-fit into the righthand end of drum 4. Adjacent to said disc 16 is a metal shield 18, which shield is adapted to receive a lamp 19 and which shield has a small, generally oval opening 17. Light from the lamp 19 travels through said opening 17, through the portion of disc 16 which is adjacent thereto (at any particular instant) and into the righthand edge of the face dial 8. Dial 8 is made of an acrylic plastic material which is, as is well known in the art, a conductor of light. So long as the outer surfaces of the acrylic plastic material are smoothly polished and in contact with the atmosphere, no light will escape from said material so long at it is reflected from side to side at less than its critical angle. However, if one side of said acrylic material is disturbed, for example by etching, painting or, as is preferred, by painting the etched disturbance then the light which is directed toward said disturbed portion diffuses. Since the diffused light reflects from that surface at all angles, much of it escapes from the opposite side of the acrylic material and causes the material to appear brilliantly luminous.

With the face dial having the cross-section shown herein, it was discovered that an oval opening, such as 17, permitted the maximum amount of light for dial 8 without causing bright streaks or spots to appear on the visible surface. However, it is to be understood that the applicant is not to be limited thereby, and it is obvious that slightly different shapes for opening 17 might be desirable if the cross-section of dial 8 were changed.

The midsection of the face dial 8 is semi-circular and, as is well known, it will cause anything observed therethrough to be magnified in a vertical direction (with respect to Fig. 2) but not in a horizonal direction. Obviously a slanted line, such as line 22 on drum 4, will appear larger and more vertically inclined than it actually is. As the magnification is increased, the line becomes distorted; however, because only a thin strip is visible through slit 7 of the socket assembly, the distortion is not noticeable until it is substantially extreme.

The speed indicator actuating mechanism (Fig. 3) is of a conventional eddy current drag type similar to that shown in U.S. Patent No. 2,649,559 issued to P. Wargo on August 18, 1953. The disclosure of said Wargo patent is hereby incorporated herein by reference to the same extent as if it were set forth in full herein. Briefly, eddy currents are induced in an aluminum speed cup 13 when the permanent magnet structure 12 is rotated by the drive shaft 11. The interaction of the magnetic fields produced by the eddy currents and by the magnetic structure 12 produces a torque on the cup 13. This causes cup 13 to rotate counterclockwise with respect to Fig. 4. Since the cup 13 is press fit into the drum 4, the drum rotates with the cup until an equal and opposite force from hairspring 20 prevents further rotation. An adjusting lever 21, which is rigidly secured to bracket 3, and which supports the outside end of hairspring 20, is provided for regulating tension of hairspring 20, thereby calibrating the speedometer mechanism.

Figure 5:
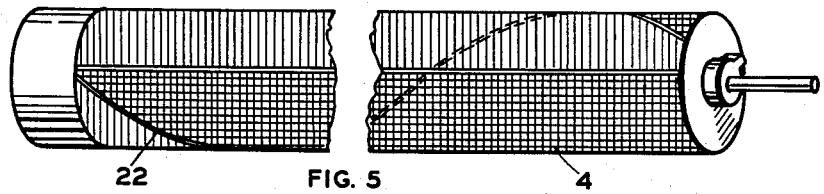
Fig. 5 shows the speedometer drum and the preferred color scheme for use thereon.

The shaft 11 rotates at a speed proportional to the speed of the vehicle; and the greater the speed of shaft 11, the greater the torque produced in speed cup 13. The shaft rotates the magnet assembly clockwise (Fig. 4) and the torque is such that drum 4 rotates clockwise. Consequently the drum 4 rotates further in a clockwise direction (with respect to Fig. 4) as the vehicle speed increases. As the drum 4 rotates clockwise, the visible portion of the white line 22 dividing the red and black surface areas of the drum (Fig. 5) moves from left to right with respect to Fig. 2 to indicate the speed of the vehicle.

The color disc rotates with the drum and as the speed increases from 0–25 m.p.h. the light passed by the disc respectively changes from a light to a dark green. As the speed exceeds 25 m.p.h., amber is passed by the disc; and as the speed increases to 50 m.p.h., the amber color deepens. As the speed exceeds 50 m.p.h., red is passed by the disc, the hue of the red deepening at the speed increases.

Obviously at the two critical speeds of 25 m.p.h. and 50 m.p.h., there is a blending of green and amber and of amber and red respectively. This blending is distinguishable by the operator and indicates the existence of said critical speeds.

Figure 3:
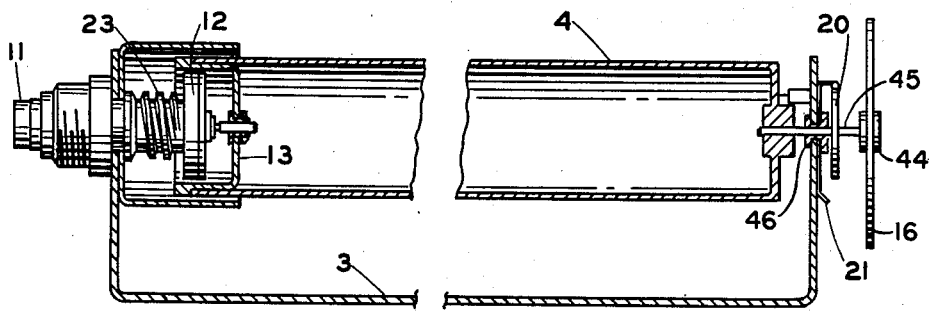
Fig. 3 shows an elevational view of the speedometer actuator, the mounting bracket, the lamp and filter disc, and, in section, the drum and the lamp shield.

Any one of several odometer mechanisms may be used, for example that shown in Figs. 8–10 of the abovesaid Wargo patent, said odometer being driven by worm 23 (Fig. 3 herein).

Figure 2:
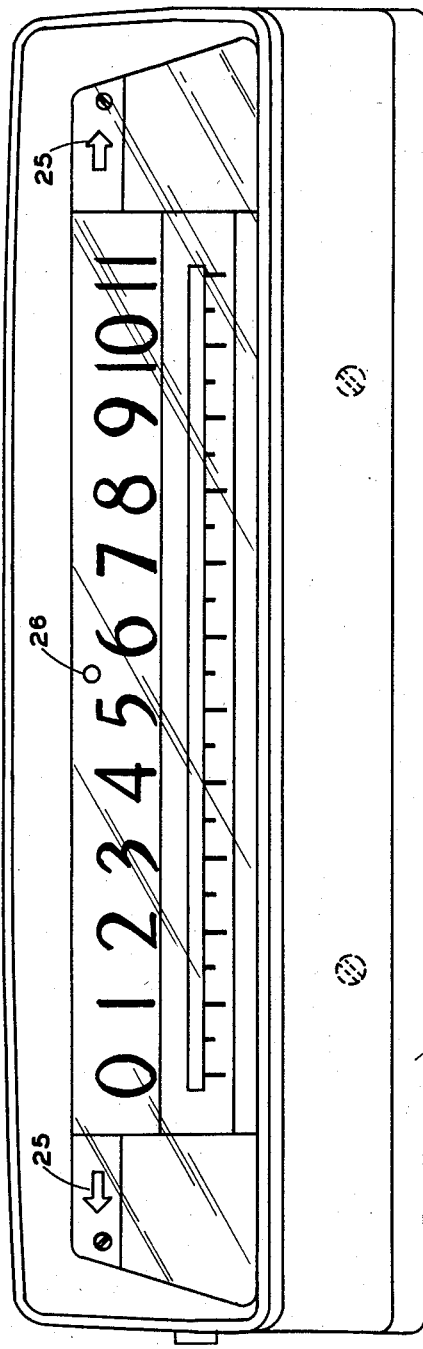
Fig. 2 shows a front elevational view of the instrument panel.

With respect to Figs. 1 and 2, it will be noted that directional turn signals 25 and a bright light signal 26 of any conventional type are provided. The light for these signals originates from the lamps (not shown) disposed within cup-shaped elements such as element 27, and is fed to the instrument panel through tubes, such as tube 28, in a manner well known in the art.

Although the preferred embodiment shows the source of light 17 in the same plane as the face dial 8, it is to be understood that the invention is not to be limited thereby.

While there has been described what is at present believed to be the preferred embodiment of the invention, it will be understood that various modifications may be made therein, and it is contemplated to cover in the appended claims all such modifications as fall within the true spirit and scope of the invention.

What is claimed is:

1. For use in a vehicle, a speed indicating mechanism comprising a substantially vertically disposed opaque socket assembly having a horizontal slit therein; an elongated drum rotatably mounted on a substantially horizontal axis adjacent to and substantially parallel with said slit; two contrasting colors on said drum defining a line spirally winding about the circumference of said drum; a stop and a biasing means for holding the drum in a position in which said line is visible through the slit in proximity to one end thereof; means responsive to the varying speed of the vehicle for rotating the drum against the force of said biasing means to predetermined angular positions corresponding to said speed, in which positions said line is visible through the slit intermediate the ends thereof; an elongated transparent light-conducting face dial mounted on said socket assembly and having marked on the surface, adjacent to said element, a calibrated scale co-operative with the visible portion of said line to indicate the instantaneous vehicle speed; a source of light disposed to edge-light said face dial, that portion of the light directed against the calibrated scale diffusing, a portion of said diffused light escaping from the dial face through the side opposite to the scale; a transparent disc interposed between said face dial and said source of light and having radial segments of different colors, each indicative of a certain speed range; and structure connecting the disc with the drum for rotation therewith in accordance with the instantaneous vehicle speed, whereby colored light indicative of the instantaneous speed range of the vehicle is directed toward the operator.

2. For use in a vehicle, a speed indicating mechanism comprising a substantially vertically disposed opaque socket assembly having a horizontal slit therein; an elongated drum rotatably mounted on a substantially horizontal axis adjacent to and substantially parallel with the slit; the drum having a narrow white strip spirally winding about the circumference thereof with a black surface on one side of the line and a red surface on the other, thereby to define an easily discernible indication line visible through the slit; a stop and a biasing means for holding the drum in a position in which the line is visible through the slit in proximity to one end thereof; means responsive to the varying speed of the vehicle for rotating the drum against the force of said biasing means to predetermined angular positions corresponding to the speed, in which positions said line is visible through the slit intermediate the ends thereof and in which the proportion of red to black surface visible through the slit is directly proportioned to the instantaneous speed; an elongated transparent light-conducting face dial mounted on the socket assembly and having marked on the surface, adjacent the element, a calibrated scale co-operative with the visible portion of the line and with the red and black surfaces to indicate the instantaneous vehicle speed; a source of light disposed to edge-light said face dial, that portion of the light directed against the calibrated scale diffusing, a portion of said diffused light escaping from the dial face through the side opposite to the scale; a transparent disc interposed between said face dial and said source of light and having radial segments of different colors, each indicative of a certain speed range; and structure connecting the disc with the drum for rotation therewith in accordance with the instantaneous vehicle speed, whereby colored light indicative of the instantaneous speed range of the vehicle is directed toward the operator.

3. For use in a vehicle, a speed indicating mechanism comprising a substantially vertically disposed opaque socket assembly having a horizontal slit therein; an elongated drum rotatably mounted on a substantially horizontal axis adjacent to and substantially parallel with the slit; the drum having a narrow white strip spirally winding about the circumference thereof with a black surface on one side of the line and red surface on the other, thereby to define an easily discernible indication line visible through the slit; a stop and a biasing means for holding the drum in a position in which the line is visible through the slit in proximity to one end thereof; means responsive to the varying speed of the vehicle for rotating the drum against the force of said biasing means to predetermined angular positions corresponding to the speed, in which positions said line is visible through the slit intermediate the ends thereof; and in which the proportion of red to black surface visible through the slit is directly proportioned to the instantaneous speed; an elongated transparent light-conducting face dial mounted on the socket assembly, the face dial including a longitudinal section in alignment with the slit and projecting convexly outwardly away from the slit, the longitudinal section having marked on the surface, adjacent the element, speed indication lines; the face dial having marked on the surface, adjacent the element, speed indication numerals, the indication lines and numerals cooperating with the visible portion of the white line to indicate the instantaneous vehicle speed; a source of light disposed to edge-light said face dial, that portion of the light directed against the indication lines and numerals diffusing, a portion of said diffused light escaping from the dial face through the side opposite to the scale; a transparent disc interposed between said face dial and said source of light and having radial segments of different colors, each indicative of a certain speed range and structure connecting the disc with the drum for rotation therewith in accordance with the instantaneous vehicle speed, whereby colored light indicative of the instantaneous speed range of the vehicle is directed toward the operator.

References Cited in the file of this patent

UNITED STATES PATENTS

| | | |
|---|---|---|
| 1,091,059 | Gore | Mar. 24, 1914 |
| 2,309,941 | Drummond | Feb. 2, 1943 |
| 2,579,806 | Dvorkin | Dec. 25, 1951 |
| 2,641,160 | Mehalakis | June 9, 1953 |
| 2,648,305 | Appleman | Aug. 11, 1953 |
| 2,678,621 | Proctor | May 18, 1954 |
| 2,693,131 | Mehalakis | Nov. 2, 1954 |
| 2,802,442 | Helgeby | Aug. 13, 1957 |

FOREIGN PATENTS

| | | |
|---|---|---|
| 206,232 | Great Britain | Nov. 1, 1923 |